United States Patent Office 2,964,569
Patented Dec. 13, 1960

2,964,569

PRODUCTION OF A CONCENTRATE OF DIMETHYL ETHERS OF 5-ALKYLPYROGALLOLS

Joseph A. Chenicek, Prairie View, and William L. Cox, Mount Prospect, Ill., assignors, by mesne assignments, to Universal Oil Products Company, Des Plaines, Ill., a corporation of Delaware No Drawing. Filed Nov. 29, 1956, Ser. No. 624,996

4 Claims. (Cl. 260—613)

This invention relates to the production of non-staining antiozonant from wood tar distillate.

Wood tar distillate is obtained by the distillation of hardwoods including hickory, oak, beech, walnut, etc. The distillate so obtained is a complex mixture of phenolic and non-phenolic compounds, including pyrogallol and 5-alkyl-pyrogallols, monomethyl ethers of pyrogallol and of 5-alkyl-pyrogallols, dimethyl ethers of pyrogallol and of 5-alkyl-pyrogallols, alkylated guaiacols, neutral oils, etc. Of this complex mixture, it has been found that the dimethyl ethers of 5-alkyl-pyrogallols are effective antiozonants in preventing the cracking of rubber due to ozone and also that these compounds will not discolor white or light-colored rubber. On the other hand, the other components of the wood tar distillate either possess no potency as antiozonants or possess staining properties and, therefore, cannot be used in white or light-colored rubber.

The wood tar distillate is first settled in order to separate a settled tar oil from soluble oils. This settling may be effected at atmospheric temperature but in many cases preferably is effected at an elevated temperature, which may range up to about 100° C. The settling at elevated temperature also effects removal of volatile components from the wood tar distillate. The present invention provides a novel method of recovering the non-staining antiozonant components from the settled wood tar distillate.

In one embodiment the present invention relates to a method of producing a non-staining antiozonant for rubber, which comprises settling wood tar distillate to separate a settled tar oil, separately withdrawing the settled tar oil and subjecting the same to treatment including the steps of (1) fractionation to separate a selected fraction boiling within the range of from about 240° to about 320° C., (2) solvent extraction with water to separate water-insoluble components, and (3) recovering the product of said treatment as said non-staining antiozonant.

From the above embodiment, it will be noted that the components useful as non-staining antiozonants are recovered from the wood tar distillate by a series of novel and interrelated steps. The novel process of the present invention offers the additional advantage of flexibility in being able to handle hardwood distillates from various sources. The exact composition of the hardwood distillate varies with the particular method of the destructive distillation and also with the particular hardwood being subjected to the destructive distillation. As hereinbefore set forth, the novel process of the present invention is able to handle these different settled distillates and to separate therefrom the desired non-staining antiozonant components.

As hereinbefore set forth, the desired components of the wood tar distillate for use as non-staining antiozonants in rubber comprise the dimethyl ethers of 5-alkyl-pyrogallols. These desired components are separated from undesired components including pyrogallol, 5-alkyl-pyrogallols, and the monomethyl ethers of these compounds, as well as from the guaiacols and the neutral oils. The neutral oils are non-phenolic compounds and do not possess antiozonant properties. The undesired phenolic compounds mentioned above either are of poor or no potency as antiozonants or are staining and, therefore, are of no use in light-colored rubber.

In a preferred embodiment, the settled wood tar distillate is first subjected to fractionation to separate a selected fraction boiling within the range of from about 240° to about 320° C. and then is subjected to solvent extraction. The fractionation may be effected in either batch or continuous types of operations and any suitable fractionation system may be employed. In order to avoid destructive reactions during the fractionation, it is preferred that the fractionation be effected under subatmospheric pressure. As a specific example of a preferred embodiment, the settled wood tar distillate is heated to a temperature of from about 175° to about 205° C. and then is flashed in a flash zone at atmospheric or subatmospheric pressure. Components boiling below about 240° C. are withdrawn as an overhead fraction, and components boiling above about 240° C. are removed as a bottoms fraction from the flash zone. The bottoms fraction then is subjected to vacuum distillation in order to separate a selected fraction comprising components boiling from about 240° to about 320° C., which fraction is removed as an overhead stream from the vacuum distillation zone. Any suitable vacuum distillation apparatus may be used and in general will be heated in the lower portion thereof to a temperature within the range of from about 175° to about 205° C. The vacuum distillation is effected utilizing a vacuum ranging from about 500 to about 5 mm. Hg absolute and preferably from about 200 to about 10 mm. Hg absolute.

It will be noted that the specific fractionation described in the previous paragraph serves to separate a selected fraction boiling within the range of from about 240° to about 320° C. In another embodiment, the selected fraction withdrawn as an overhead from the vacuum distillation zone will be within the boiling range of from about 270° to about 305° C. and the fractionation is suitably modified to effect this separation. It is understood that any suitable method for effecting separation of the desired fraction may be employed. However, as hereinbefore set forth, it is preferred that the fractionation be effected at least in part at subatmospheric pressure in order to avoid destructive reactions during the separation.

Following fractionation of the selected fraction in the manner hereinbefore set forth, the selected fraction then is subjected to solvent extraction with water or water-alcohol solvent. The solvent extraction may be effected at a temperature within the range of from about 20° to about 150° C. Generally, superatmospheric pressure will be employed at elevated temperatures in order to maintain the solvent in liquid phase. Any suitable solvent extraction system may be employed, which may be either continuous or batch type operation. In one embodiment the selected fraction of wood tar distillate is passed into the upper portion of a vertical extraction zone, and the solvent is introduced into the lower portion thereof, to pass upwardly countercurrently to the descending wood tar distillate. In this embodiment, the extraction zone preferably contains bubble decks, bubble trays, side-to-side pans, etc. or other suitable means for effecting intimate contacting of the solvent and wood tar distillate. In another method, the wood tar distillate and solvent may be intimately mixed and allowed to settle and separate into phases. The different phases then each are separately withdrawn in any suitable manner, including decantation of the upper layer, draining of the lower layer, etc. In still another method, intimate mixing of the solvent and wood tar distillate may be effected by centrifugal contacting and also separated in this manner.

In one embodiment of the invention, the solvent comprises water and in another embodiment of the invention the solvent comprises a water-alcohol solution. Methanol is particularly preferred as the alcohol for use in the solvent. Other alcohols include ethanol, isopropanol, butanol, etc. Higher boiling alcohols generally are not preferred because of the possibility of forming azeotropic mixtures which will interfere with subsequent clean separation of the solvent from the wood tar distillate. The alcohol concentration may range from 5% to 80% by volume of the solvent and preferably from 10% to 60%. The proportion of solvent to wood tar distillate will vary with the particular wood tar distillate, but is within the range of from about 0.5 to about 100 volumes of solvent per volume of wood tar distillate and preferably of from about 5 to about 30 volumes of solvent per volume of wood tar distillate.

The raffinate or water-insoluble components removed from the solvent extraction step comprises the desired dimethyl ethers of 5-alkyl-pyrogallols. In this embodiment of the invention, the wood tar distillate has been previously fractionated so that the raffinate recovered from the solvent extraction will be of the desired chemical and physical properties for use as non-staining antiozonants in rubber. However, in some cases it may be necessary to purify or further treat this fraction in order to insure the removal of undesired components and this may be effected in any suitable manner including further fractionation, further solvent extraction with the same or different solvents, etc. It is understood that the process of the present invention also may be used in conjunction with other methods for separating the desired components from wood tar distillate.

The rich solvent withdrawn from the solvent extraction step of the process preferably is treated to recover the solvent for further use in the process and to separate wood tar distillate which may be used for other purposes, including use as an antioxidant for the organic substrates as, for example, gasoline, higher boiling oils, grease, etc. In a preferred method, the solvent is removed from the wood tar distillate by fractionation of the solvent. This is readily accomplished by heating the rich solvent solution to a suitable temperature in order to volatilize and remove the solvent as an overhead fraction. The temperature to be employed will depend upon the particular solvent and generally will be within the range of from about 40° to about 200° C.

In another preferred embodiment, the settled wood tar distillate is first subjected to solvent extraction and then is subjected to fractionation to separate the selected fraction. The solvent extraction will be effected in substantially the same manner as hereinbefore set forth and thereafter the raffinate is subjected to fractionation in the manner hereinbefore set forth to recover a selected fraction comprising the non-staining antiozonant.

As hereinbefore set forth, the dimethyl ethers of 5-alkyl-pyrogallols are effective antiozonants in rubber and will not discolor light-colored rubber. The dimethyl ethers which appear to predominate in wood tar distillates include the dimethyl ethers of 5-methyl-pyrogallol and of 5-n-propyl-pyrogallol. It is understood that other dialkyl ethers of 5-alkyl-pyrogallols which are present in the wood tar distillate will be recovered by the novel process of the present invention and these may include one or more of the following: dimethyl ethers of 5-ethyl-pyrogallol, 5-n-butyl-pyrogallol, 5-isobutyl-pyrogallol, 5-n-amyl-pyrogallol, etc., as well as the diethyl ethers and possibly the dipropyl ethers of the 5-alkyl-pyrogallols.

As hereinbefore set forth, the dimethyl ethers of 5-alkyl-pyrogallols are of especial utility in preventing ozone cracking of white or light-colored rubber. Most of the light-colored rubber now being manufactured commercially is prepared from natural rubber and, therefore, these antiozonants are particularly suitable for use in light-colored natural rubber. However, it is necessary that dark-colored rubber molded with or otherwise adjoining light-colored rubber also must contain a non-staining antiozonant, and the antiozonants recovered by the present invention, therefore, advantageously are utilized in such dark-colored rubber.

Natural rubber generally is regarded as comprising naturally occurring isoprene polymers. The natural rubbers include Hevea rubber, caoutchouc, balata, gutta-percha, etc. Although natural rubber appears to have better tear resistance during normal service than synthetic rubber, the natural rubber does undergo ozone cracking and, in unusual service or long periods of service, does fail because of ozone cracking. Furthermore, the presence of cracks in rubber products also is objectionable for aesthetic reasons. Customers and users of rubber products object to the unsightly cracks in the rubber and, therefore, it is important that such cracks be avoided.

While the antiozonant is particularly applicable for use in light-colored natural rubber and the dark-colored rubber associated therewith, it is understood that the antiozonant may be used for the stabilization of other dark-colored natural rubber, as well as for preventing ozone cracking of synthetic rubber. Much of the synthetic rubber now being produced commercially is known in the art as GR–S rubber and is a copolymer of butadiene and styrene. Other synthetic rubbers include those produced from butadiene and acrylonitrile (Buna–N), butadiene and isobutylene (butyl rubber), etc. Still other synthetic rubbers include Thiokol rubber, silicone rubber, neoprene rubber, etc.

It is understood that the antiozonant can be utilized in any rubber composition subject to ozone cracking, including those used for rubber tires and tubes, hose, belts, sheet and thread rubber, rubberized fabrics, molded goods, boots and shoes, etc., whether vulcanized in a mold, in open steam, in hot air or in the cold by the so-called acid process. Furthermore, it is understood that the antiozonant can be used in reclaims and latices of rubbery materials, whether or not admixed with fillers, pigments, accelerating agents, etc. In another embodiment the antiozonant can be utilized for the stabilization of adhesives, elastomers, etc. which tend to crack due to ozone.

In general, the antiozonant is utilized in a concentration of from about 0.25% to about 10% by weight of the rubber hydrocarbon and preferably in a concentration of from about 2% to about 5% by weight thereof. These concentrations are based on the rubber hydrocarbon, exclusive of the other components of the final rubber composition, and are used in this manner in the present specifications and claims. It is understood that the antiozonant is utilizable along with other additives incorporated in rubber for specific purposes including, for example, antioxidants, accelerators, softeners, extenders, wax, reinforcing agents, etc.

The antiozonant normally is employed along with certain commercial antioxidants which are incorporated in the latex prior to milling with the other components of the rubber. In this embodiment, the antiozonant thus is used along with a separate antioxidant. Any suitable antioxidant may be employed including, for example, phenyl,beta-naphthylamine, 6-phenyl-2,2,4-trimethyl-1,2-dihydroquinoline, marketed under the trade name of "Santoflex-B," 2,2'-methylene-bis-(4-methyl-6-tert-butyl-p-cresol), the reaction product of acetone and diphenylamine, marketed under the trade name of "B.L.E.," etc. These antioxidants generally are used in a concentration from about 0.5% to about 3% by weight of the rubber.

The antiozonant also normally is employed along with paraffin and/or microcrystalline wax. The wax generally is utilized in a concentration of from about 0.5% to about 3% by weight of the rubber.

In one embodiment, the antiozonant of the present invention is admixed with the antioxidant and/or wax, and the mixture then is composited with one or more of the other components of the rubber composition.

The antiozonant is incorporated in the rubber or rubbery product in any suitable manner and at any suitable stage of preparation. When the antiozonant is added to a liquid, such as rubber pigment or an oil, it is dissolved therein in the desired proportions. When it is to be added to a solid substrate, it is incorporated therein by milling, mastication, etc. The additive may be utilized as such or as a solution or dispersion, or as a powder, paste, etc.

The following examples are introduced to illustrate further the novelty and utility of the present invention but not with the intention of unduly limiting the same.

*Example I*

The data reported in this example were obtained with samples of white natural rubber stock being manufactured by one of the rubber companies and marketed for commercial use. The rubber was cut into strips of 6.00" x 0.50" x 0.075". In the sample containing additive, the additive was incorporated into the rubber sample by immersing and swelling the sample in a solution containing the additive and toluene as a solvent. The concentration of additive was selected to leave in the rubber sample, after the toluene had been removed, a concentration of additive of about 3 parts by weight per 100 parts by weight of rubber hydrocarbon. The rubber sample remained in the solution for about 16 hours and, after this time, the toluene was evaporated by exposing the sample to air at room temperature for two hours, followed by heating for one hour at 195° F. in an air oven. After cooling, the sample was elongated 20% and mounted on a waxed wooden panel, along with the control sample (sample not containing the additive). The samples then were exposed in an ozone cabinet to air containing about 50 parts of ozone per 100 million parts of air at a temperature of about 100° F.

The antiozonant used in this example is the dimethyl ether of 5-propyl-pyrogallol. In a control sample of the rubber (sample not containing the additive), visible cracks appeared in the rubber after 6 hours exposure in the ozone cabinet. On the other hand, a sample of the rubber containing 3 parts by weight of the dimethyl ether of 5-propyl-pyrogallol per 100 parts by weight of rubber hydrocarbon did not show visible cracks until after about 34 hours' exposure in the ozone cabinet. Furthermore, both rubber samples were of substantially the same color, thus showing that no discoloration occurred in the sample containing the additive.

From the data in the above example, it will be noted that the dimethyl ether of 5-propyl-pyrogallol served to considerably retard cracking of the rubber due to ozone and also that it did not discolor the rubber.

*Example II*

The antiozonant used in this example is the dimethyl ether of 5-methyl-pyrogallol. This additive was incorporated in another sample of the white natural rubber in a concentration of about 3 parts by weight per 100 parts by weight of rubber hydrocarbon.

A control sample and a sample of the rubber containing the additive (dimethyl ether of 5-methyl-pyrogallol) were exposed to ozone in an ozone cabinet in substantially the same manner as described in Example I except that in this case the ozone concentration was maintained at about 100 parts of ozone per 100 million of air. Visible cracks appeared in the control sample (sample not containing the additive) within 5 hours after exposure in the ozone cabinet. On the other hand, visible cracks did not appear in the sample containing the additive until after 24 hours' exposure in the ozone cabinet. Furthermore, in the control sample after 8 hours of exposure, the cracks were large, whereas after 48 hours the cracks in the sample containing the additive were only fine cracks. Furthermore, both samples of rubber were of substantially the same color, thus showing that the additive did not discolor the rubber.

From the above data, it will be noted that the antiozonant served to considerably retard cracking of the rubber, as well as keeping the cracks, when they did appear, to a much smaller size. In addition, the additive did not discolor the white rubber.

*Example III*

A commercial settled wood tar distillate is heated to about 195° C. and flashed at atmospheric pressure into a flash zone. The overhead removed from the flash zone comprises components boiling below about 240° C. The bottoms fraction contains the higher boiling components of the settled wood tar distillate and is removed from the lower portion of the flash zone and subjected to vacuum distillation under a sub-atmospheric pressure of about 10 mm. Hg. The lower portion of the vacuum distillation zone is maintained at a temperature of about 195° C. This serves to produce an overhead fraction containing components boiling from about 240° to about 320° C. The overhead fraction from the vacuum distillation is condensed and then subjected to solvent extraction using water as the solvent. The water is used in a proportion of 20 volumes of water per volume of wood tar distillate. The solvent extraction is effected by introducing the wood tar distillate into the upper portion of a vertical extraction zone equipped with bubble decks, and introducing the water into the lower portion of this zone, the ascending stream of water passing countercurrently to the descending stream of wood tar distillate.

The extraction is effected at ambient temperature. The raffinate or water-insoluble components are withdrawn from the lower portion of the extraction zone and comprise the desired dimethyl ethers of 5-alkyl-pyrogallols. The rich solvent is withdrawn from the upper portion of the extraction zone and is subjected to distillation to separate the water as an overhead fraction from the higher boiling wood tar extract.

*Example IV*

The operation of this example is effected in substantially the same manner as described in Example III except that the solvent comprises a 20% methanol-water solution and the extraction is effected at a temperature of 60° C. and a pressure of 20 pounds per square inch.

*Example V*

The operation of this example is effected in substantially the same manner as described in Example IV except that the solvent comprises a 40% methanol-water solution and the extraction is effected at ambient temperature and atmospheric pressure.

*Example VI*

In this example, settled wood tar distillate is subjected to fractionation by heating and flashing to remove overhead components boiling below 270° C. and to leave a bottoms fraction containing components boiling above 270° C. The bottoms fraction then is subjected to vacuum distillation to remove an overhead fraction containing components boiling from about 270° to about 305° C. The overhead fraction is subjected to solvent extraction using a 40% methanol-water solvent. The raffinate is withdrawn from the solvent extraction zone and is recovered as the desired dimethyl ethers of 5-alkyl-pyrogallol.

*Example VII*

In this example, a commercial settled wood tar distillate is subjected to solvent extraction using a 25% methanol-water solution at ambient temperature and atmospheric pressure. The raffinate is separaely withdrawn from the solvent extraction zone and is subjected to distillation under a vacuum of about 200 mg. Hg absolute to remove as an overhead fraction material boiling below 240° C. The material boiling above 240° C. is withdrawn as a bottoms fraction and is subjected to distillation under a vacuum of 10 mm. Hg absolute to separate an overhead fraction containing components boiling from about 240° to about 320° C.

We claim as our invention:

1. A method of producing a concentrate of dimethyl ethers of 5-alkyl-pyrogallols which comprises flashing a settled wood tar distillate to leave a bottoms fraction boiling above about 240° C., vacuum distilling said bottoms fraction to separate an overhead fraction boiling between about 240° C. and about 320° C., subjecting said overhead fraction to solvent extraction with water at a temperature of from about 20° C. to about 150° C., whereby to separate water-soluble from water-insoluble components, and recovering the water-insoluble components as said concentrate.

2. The method of claim 1 further characterized in that the water solvent additionally contains an alcohol selected from the group consisting of methanol, ethanol, isopropanol and butanol.

3. A method of producing a concentrate of dimethyl ethers of 5-alkyl-pyrogallols which comprises extracting a settled wood tar distillate with water at a temperature of from about 20° C. to about 150° C., vacuum distilling the resultant raffinate to leave a bottoms fraction boiling above about 240° C., then vacuum distilling said bottoms fraction to separate an overhead fraction boiling between about 240° C. and about 320° C., and recovering the overhead fraction as said concentrate.

4. The method of claim 3 further characterized in that the water solvent additionally contains an alcohol selected from the group consisting of methanol, ethanol, isopropanol and butanol.

References Cited in the file of this patent

UNITED STATES PATENTS

| | | |
|---|---|---|
| 2,246,973 | Camilli et al. | June 24, 1941 |
| 2,564,911 | Mavity | Aug. 21, 1951 |

OTHER REFERENCES

Hunter et al.: Jour. American Chem. Soc., vol. 61 (1939), pages 516–521.